(12) United States Patent
Matsuura et al.

(10) Patent No.: US 7,854,515 B2
(45) Date of Patent: Dec. 21, 2010

(54) PROJECTION TYPE IMAGE DISPLAY APPARATUS

(75) Inventors: Atsushi Matsuura, Sakai (JP); Kohtaro Hayashi, Toyonaka (JP); Jun Ishihara, Kobe (JP); Masayuki Imaoka, Izumiotsu (JP)

(73) Assignee: Konica Minolta Opto, Inc., Tokyo (JP)

( * ) Notice: Subject to any disclaimer, the term of this patent is extended or adjusted under 35 U.S.C. 154(b) by 1292 days.

(21) Appl. No.: 11/393,157

(22) Filed: Mar. 30, 2006

(65) Prior Publication Data

US 2006/0221312 A1 Oct. 5, 2006

(30) Foreign Application Priority Data

Apr. 1, 2005 (JP) ............... 2005-106655

(51) Int. Cl.
*G03B 21/14* (2006.01)
*G03B 21/22* (2006.01)
*G03B 21/28* (2006.01)
*G03B 21/00* (2006.01)

(52) U.S. Cl. .................... 353/22; 353/74; 353/99; 353/122

(58) Field of Classification Search ............ 353/74–75, 353/97, 99, 119, 122, 22; 359/858, 864, 359/291; 348/771, 789
See application file for complete search history.

(56) References Cited

U.S. PATENT DOCUMENTS

| | | | |
|---|---|---|---|
| 6,280,036 B1 | 8/2001 | Suzuki | |
| 6,513,936 B1 * | 2/2003 | Ishiwa et al. | 353/56 |
| 6,704,131 B2 * | 3/2004 | Liu | 359/290 |
| 6,752,500 B1 * | 6/2004 | Yoshii et al. | 353/78 |
| 6,779,894 B2 | 8/2004 | Shiraishi et al. | |
| 6,886,947 B2 * | 5/2005 | Konishi | 353/119 |
| 7,149,041 B2 * | 12/2006 | Hsu et al. | 359/820 |
| 7,165,848 B2 * | 1/2007 | Gishi | 353/88 |
| 7,241,015 B2 * | 7/2007 | Hirata et al. | 353/20 |
| 7,357,519 B2 * | 4/2008 | Lee et al. | 353/119 |
| 2002/0196556 A1 * | 12/2002 | Hirata et al. | 359/649 |
| 2009/0195752 A1 * | 8/2009 | Wang et al. | 353/22 |

FOREIGN PATENT DOCUMENTS

| | | |
|---|---|---|
| JP | 2002-341288 | 11/2002 |
| JP | 2003-121783 | 4/2003 |
| JP | 2003-337380 | 11/2003 |
| JP | 2004-12749 | 1/2004 |
| JP | 2004-12750 | 1/2004 |

* cited by examiner

*Primary Examiner*—Tony Ko
*Assistant Examiner*—Jori S Reilly-Diakun
(74) *Attorney, Agent, or Firm*—Brinks Hofer Gilson & Lione

(57) ABSTRACT

An projection type image display apparatus includes a projection optical system having a plurality of concave mirrors and digital micromirror device (DMD). An optical path from the DMD to the concave mirror closest to the DMD is a sealed space which is surrounded by an image forming device holding plate holding the DMD, an optical component holding member holding the concave mirror and the image forming device holding plate, and a cover glass (transparent dust-proof cover) arranged on the optical path from the DMD to the concave mirror closest to the DMD.

19 Claims, 16 Drawing Sheets

| $\theta_{dOFF}$ (degree) | $\theta_{fy}$ (degree) | $\theta_p$ (degree) | Values of the left-hand side of the equation (15) (degree) | Values of the right-hand side of the equation (15) (degree) |
|---|---|---|---|---|
| -10 | 9 | -6 | -1 | 45 |
| -12 | 11 | -6 | -1 | 43 |
| -14 | 13 | -6 | -1 | 41 |
| -10 | 5 | -6 | -5 | 49 |
| -12 | 6 | -6 | -6 | 48 |
| -10 | 5 | 0 | -5 | 55 |
| -12 | 11 | -15 | -1 | 34 |

FIG. 17

| $\theta_{doFF}$ (degree) | $\theta_{fy}$ (degree) | Values of the right-hand side of the equation (15) (degree) |
| --- | --- | --- |
| −10 | 9 | −19 |
| −12 | 11 | −23 |
| −14 | 13 | −27 |
| −10 | 5 | −15 |
| −14 | 6 | −20 |

*FIG. 18*

| H (mm) | X (mm) | $\theta_{fy}$ (degree) | $\theta_p$ (degree) | Values of the right-hand side of the equation (23) (degree) |
| --- | --- | --- | --- | --- |
| 10 | 25 | 9 | −6 | −23.4 |
| 10 | 25 | 11 | −6 | −26.1 |
| 10 | 25 | 13 | −6 | −27.8 |
| 10 | 25 | 5 | −6 | −20.9 |
| 10 | 25 | 6 | −6 | −21.7 |
| 10 | 25 | 5 | 0 | −15.5 |
| 10 | 25 | 11 | −15 | −33.8 |
| 10 | 50 | 9 | −6 | −20.0 |
| 10 | 50 | 11 | −6 | −21.9 |
| 10 | 50 | 13 | −6 | −23.8 |
| 10 | 50 | 5 | −6 | −16.3 |
| 10 | 50 | 6 | −6 | −17.2 |
| 10 | 50 | 5 | 0 | −10.5 |
| 10 | 50 | 11 | −15 | −30.3 |

*FIG. 19*

PROJECTION TYPE IMAGE DISPLAY APPARATUS

This application is based on the application No. 2005-106655 filed in Japan Apr. 1, 2005, the entire content of which is hereby incorporated by reference.

BACKGROUND OF THE INVENTION

1. Field of the Invention

The present invention relates to a projection type image display apparatus that enlarges and projects an image formed by a reflection type image forming device or a transmission type image forming device.

2. Description of the Related Art

Projection optical systems that enlarge and project images formed by image forming devices in projection type image display apparatuses are roughly classified into refraction optical systems composed of refraction type optical elements such as lenses, and reflection optical systems composed of reflection type optical elements such as mirrors. In general, since reflection optical systems have no chromatic aberration, they have a feature such that more fine images can be obtained.

When dust and dirt adhere to image forming devices, their images are projected onto enlarged and projected images, thereby causing deterioration in image quality. U.S. Pat. No. 6,280,036 B1 and Japanese Patent Application Laid-Open No. 2003-337380 disclose constitutions that prevent dust and dirt from adhering to image forming devices in projection type image display apparatuses that adopt refraction optical systems as projection optical systems. U.S. Pat. No. 6,280,036 B1 discloses the projection type image display apparatus which is constituted so that an opening of an optical housing is sealed by a field lens and a trimming filter, a lens barrel of a projection optical system is mounted to the optical housing, and the inside of the optical housing which houses an image forming device is sealed. Japanese Patent Application Laid-Open No. 2003-337380 discloses the projection type image display apparatus which is constituted so that an entire optical system excluding a light source (including an image forming device) is arranged in a sealed space.

A structure that effectively prevents adhesion of dust and dirt to the image forming devices is not, however, proposed for the projection type image display apparatuses that adopt the reflection optical systems as the projection optical systems. This is because it is difficult that the reflection optical systems adopt the sealed structure. Concretely, since the reflection optical systems have high sensitivity, it is necessary to adjust positions and angles of the reflection type optical elements such as curved mirrors at the time of manufacturing. In order to enable this adjustment, since it is necessary to secure an access to the reflection type optical elements, the adoption of the sealed structure is difficult. Further, since an optical path in the reflection optical systems bend and extend among a plurality of reflection type optical elements, a space of the optical path is large. This makes the adoption of the sealed structure difficult.

SUMMARY OF THE INVENTION

It is an object of the present invention to prevent adhesion of dust and dirt to an image forming device in a projection type image display apparatus which adopts a reflection optical system as a projection optical system.

According to a first aspect of the present invention, a projection type image display apparatus includes: an image forming device forming an image; a projection optical system for projecting the image onto a screen, having a plurality of curved mirrors; an optical component holding member holding the image forming device; a transparent dust-proof cover arranged on an optical path between the image forming device and the curved mirror closest to the image forming device, the transparent dust-proof cover being held to the optical component holding member; and a sealed structure sealing at least a space between the image forming device and the transparent dust-proof cover.

The image forming device and the entire projection optical system are not sealed, the space surrounded by the image forming device and the transparent dust-proof cover is sealed. For this reason, while an access to the curved mirrors in the projection optical system for adjustment of positions and angles at the time of manufacturing is being maintained, intrusion of dust and dirt around the image forming device which causes deterioration in image quality can be prevented.

According to a second aspect of the present invention, a projection type image display apparatus includes: an image forming device forming a image; a projection optical system for projecting the image formed by the image forming device onto a screen, having a plurality of curved mirrors,; an optical component holding member holding the image forming device and the curved mirrors; and a transparent dust-proof cover arranged on an optical path between the image forming device and the curved mirror closest to the image forming device, the transparent dust-proof cover being held to the optical component holding member, wherein the optical component holding member seals a space between the transparent dust-proof cover and the image forming device.

According to a third aspect of the present invention, an unit for a projection type image display apparatus includes: an optical component holding member holding a concave mirror, having a portion in which an image forming device holder for holding a image forming device is fixed; and a transparent dust-proof cover arranged on an optical path between the image forming device and the concave mirror, the transparent dust-proof cover being held to the optical component holding member, wherein the optical component holding member surrounds a space between the image forming device and the dust-proof cover.

BRIEF DESCRIPTION OF THE DRAWINGS

These and other objects, advantages and features of the invention will become apparent from the following description thereof taken in conjunction with the preferred embodiments with the reference to the accompanying drawings in which:

FIG. 17 is a list showing values of a left-hand side and a right-hand side of an equation (12) corresponding to combinations of concrete numerical values: an angle $\theta_{dOFF}$ of a micromirror 11B in an OFF state, a divergence angle $\theta_{fv}$ of projection light and an angle $\theta_P$ of an upper ray PP;

FIG. 18 is a list showing combinations of the angles $\theta_{dOFF}$ and $\theta_{fv}$ and values of a left-hand side of an equation (14) corresponding the combinations; and FIG. 19 is a list showing values of a right-handed side of an equation (20) corresponding to combinations of concrete numerical values: a height H of a mirror plane of DMD; a distance X from the mirror plane of DMD to an upper end of a cover glass; a divergence angle $\theta_{fv}$ of projection light; and an angle $\theta_P$ of a principal ray of the projection light.

DETAILED DESCRIPTION OF THE PREFERRED EMBODIMENT

Embodiments of the present invention are explained below with reference to the drawings.

Figure 1:
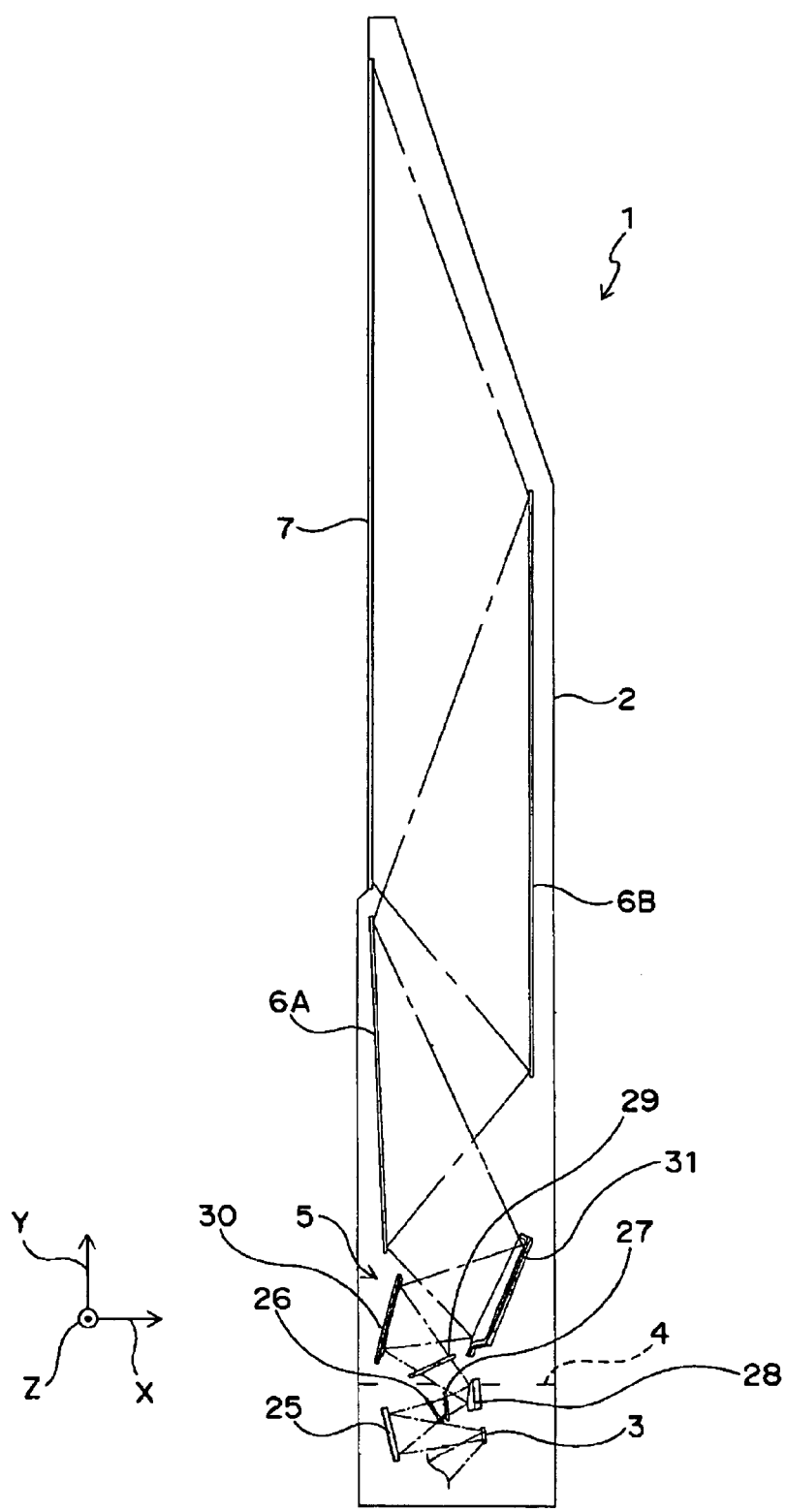
FIG. 1 is a schematic diagram illustrating a rear projection television according to an embodiment of the present invention.

FIG. 1 illustrates a rear-projection television 1 according to an embodiment of a projection type image display apparatus of the present invention. A casing 2 of the rear-projection television 1 houses a digital micromirror device (DMD) 3 as one example of a reflection type image forming device, an illumination optical system 4 that emits illumination light to the DMD 3, and a projection optical system 5 that enlarges and projects projection light reflected by the DMD 3, namely, an image. Further, a screen 7 onto which an image enlarged by the projection optical system 5 is projected via two plane mirrors 6A and 6B is disposed on a front upper surface of the casing 2.

Figure 2:
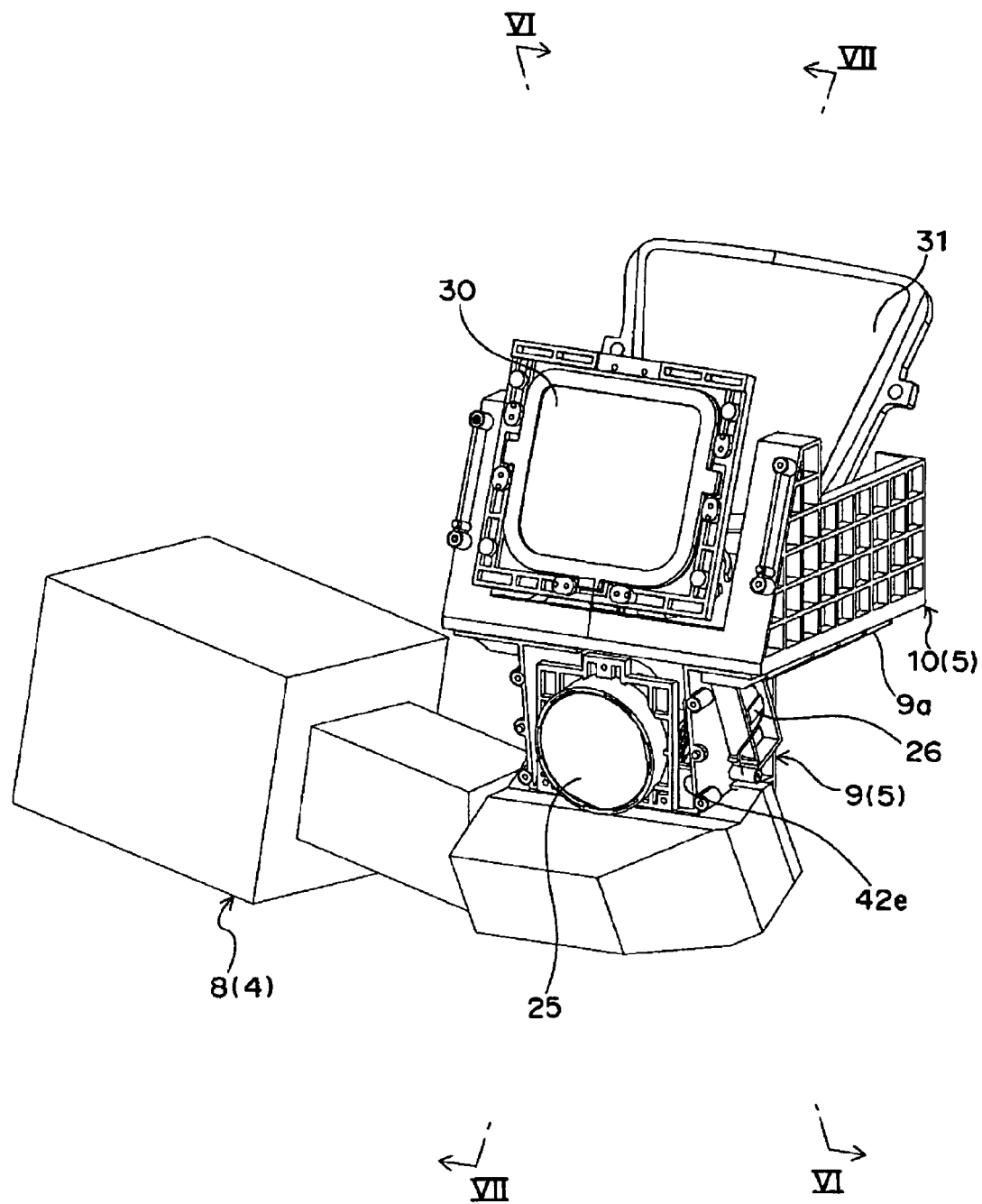
FIG. 2 is a perspective view illustrating an outline of an illumination optical system and a projection optical system according to the embodiment of the present invention.
Figure 3:
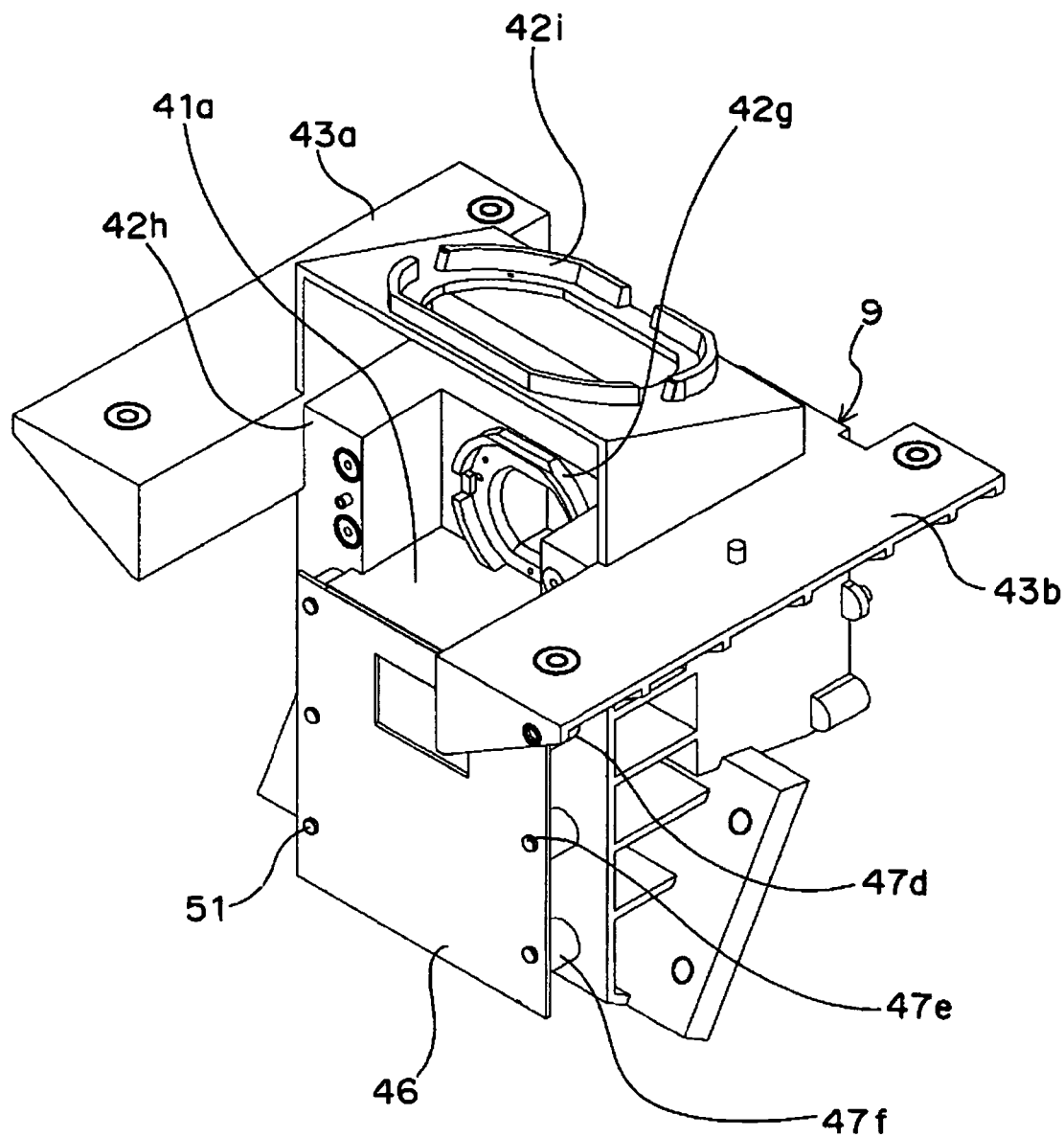
FIG. 3 is a perspective view of a lower optical component holding member.
Figure 4:
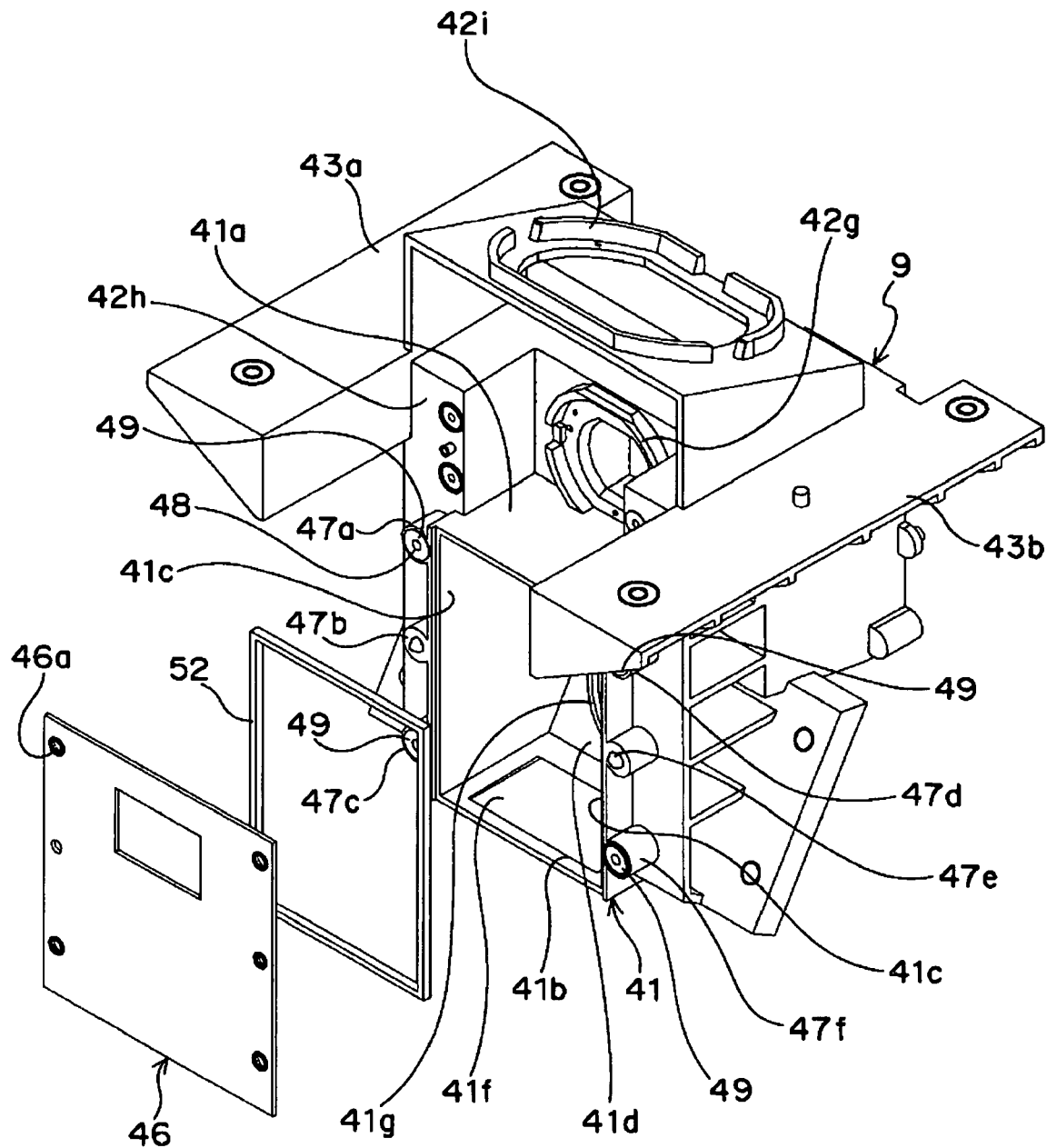
FIG. 4 is an exploded perspective view illustrating a lower optical component holding member.

With reference also to FIG. 2, in addition to a case 8 that houses the illumination optical system 4, a lower optical component holding member 9 and an upper optical component holding member 10 are housed in a lower part of the casing 2. As detailed later, the lower and upper optical component holding members 9 and 10 hold optical parts of the DMD 3 and the projection optical system 5. With reference also to FIGS. 3 and 4, the lower optical component holding member 9 has a pair of seats 43a and 43b on its upper outside. The upper optical component holding member 10 is placed on the seats 43a and 43b.

(DMD)

Figure 12:
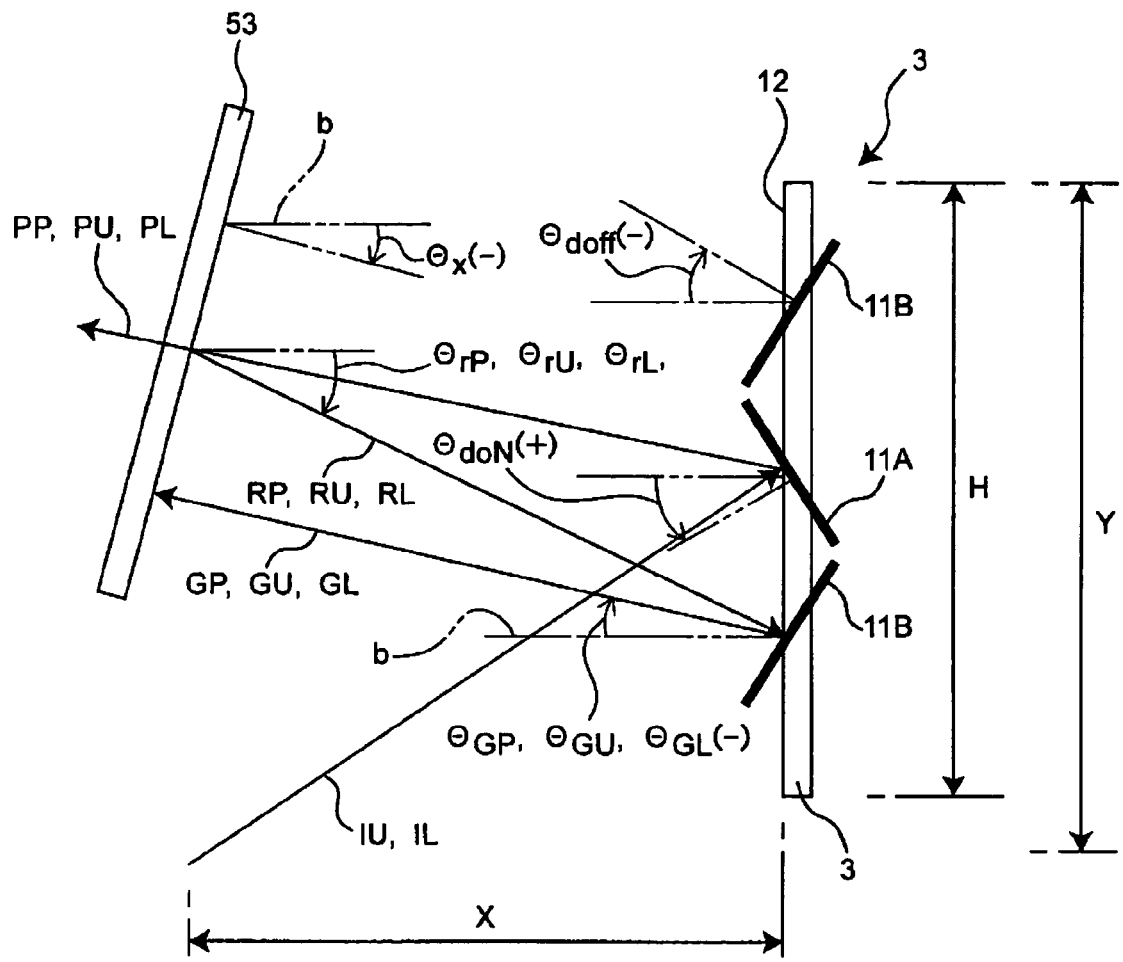
FIG. 12 is a schematic diagram illustrating a posture and an optical path of micromirrors.

DMD 3 is a microdisplay manufactured by Texas Instruments Incorporated which is an image forming device that spacially modulates entering light according to a reflecting direction. With reference to FIG. 12, the DMD 3 has a mirror plane (image forming surface) 12 which is composed so that a lot of minute micromirrors 11A and 11B are arranged two-dimensionally. Reflecting angles of the individual micromirrors 11A and 11B can be switched between two directions independently. The respective micromirrors 11A and 11B correspond to pixels of an image to be projected onto the screen 7. The micromirror 11A which is set at one of the two reflecting angles is in an "ON" state. Ray flux from the illumination optical system 4, which is reflected by the micromirror 11A in the ON state, is projected onto the screen 7 via the projection optical system 5 and plane mirrors 6A and 6B. On the other hand, the micromirror 11B which is set at the other reflecting angle of the two angles is in an "OFF" state. Light flux from the illumination optical system 4 reflected by the micromirror 11B in the OFF state does not enter the projection optical system 5 but is displayed as black dots on the screen 7.

Figure 8:
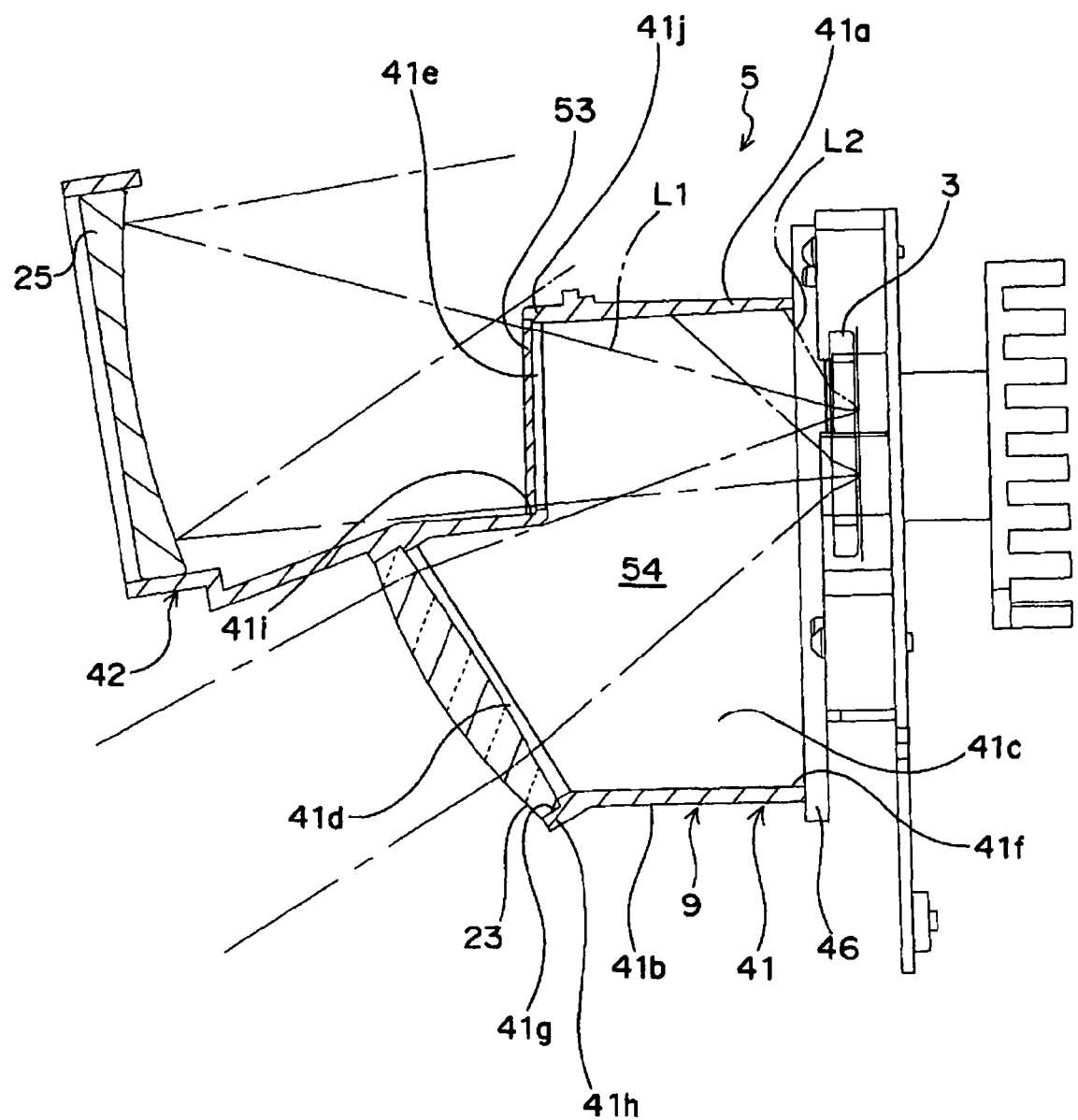
FIG. 8 is a partially enlarged diagram of FIG. 7.

In FIG. 8, a reference symbol L1 designates the projection light reflected by the micromirror 11A in the ON state, and a reference symbol L2 designates light flux (OFF light) reflected by the mirror 11B in the OFF state. The mirror plane 12 in this embodiment has a rectangular shape having a long side (extends in a direction Z in the drawing) and a short side (extends in a direction Y in FIG. 1), and pivot of the micromirrors 11A and 11B are parallel with the long side of the mirror plane 12. Both ON light and OFF light of illumination light which enters the DMD 3 from below are reflected upward.

(Illumination Optical System)

Figure 5:
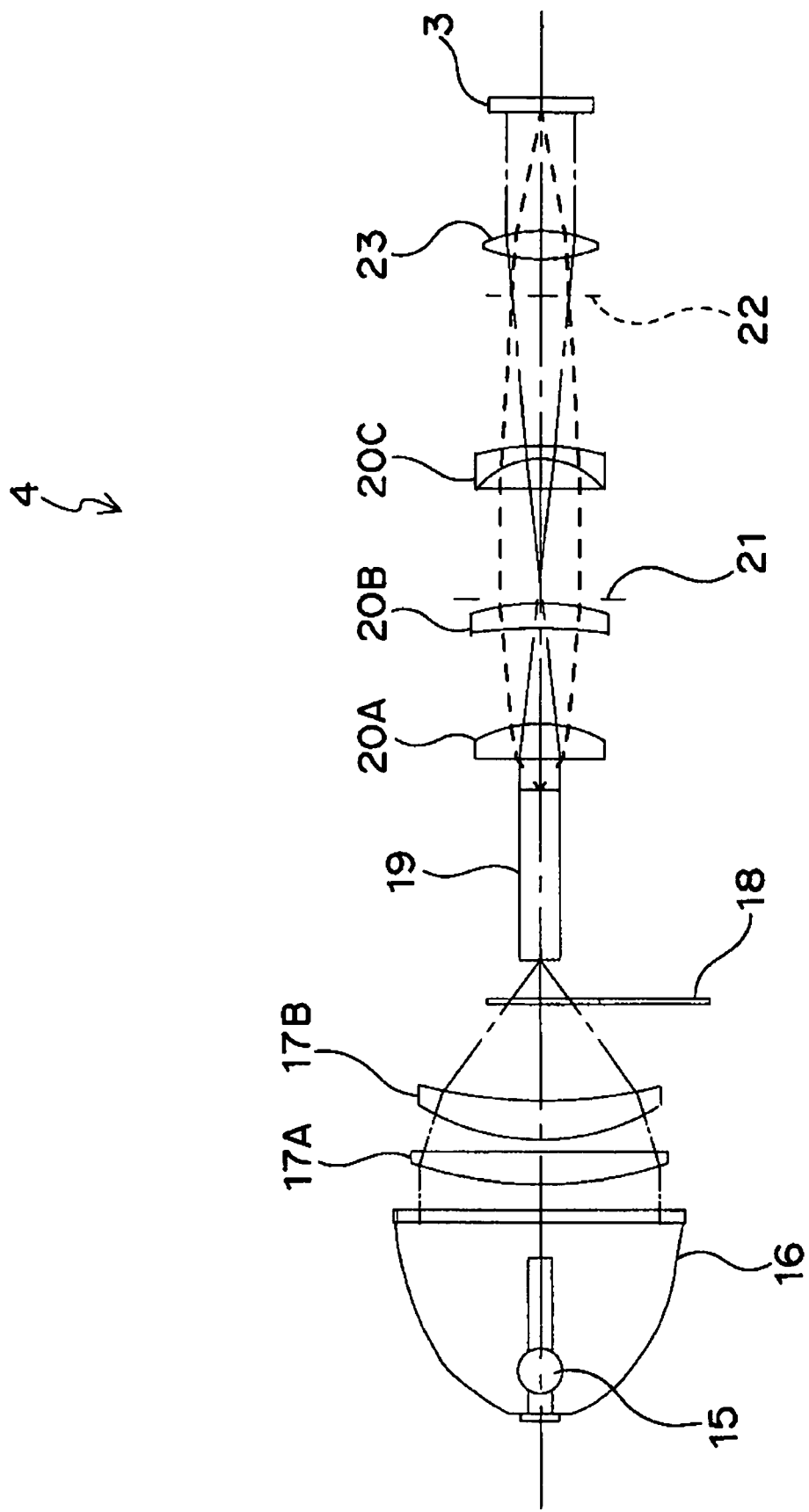
FIG. 5 is a constitutional diagram of the illumination optical system.
Figure 6:
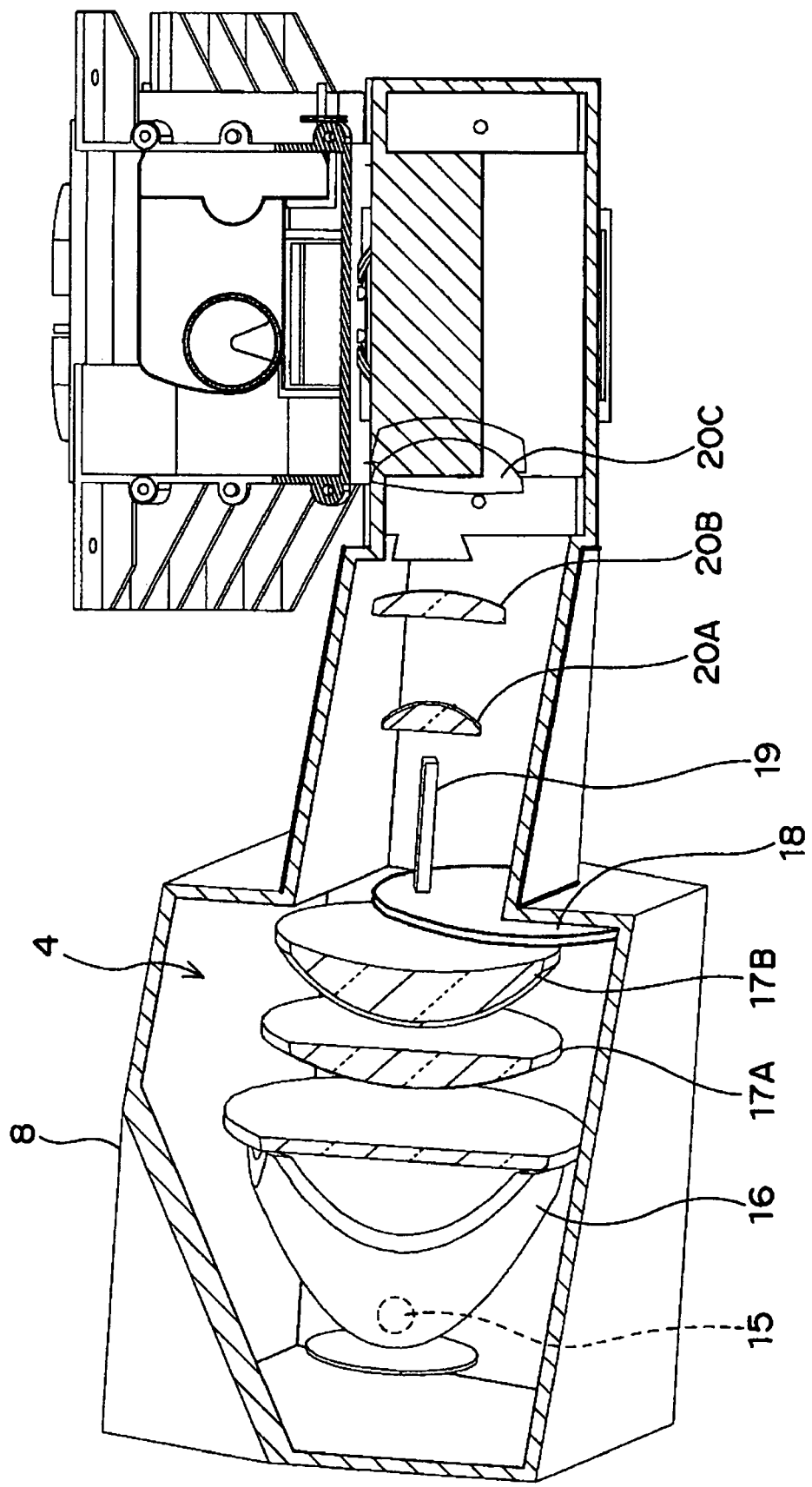
FIG. 6 is a sectional view taken along line VI-VI in FIG. 2.

With reference to FIGS. 5 and 6, the illumination optical system 4 has a discharge lamp 15 composed of, for example, an ultra high pressure mercury lamp, a parabolic mirror 16, condenser lenses 17A and 17B, a color wheel 18, an integrator rod 19, relay lenses 20A, 20B and 20C, a diaphragm 21, a mirror 22 and an entrance lens 23. A thick broken line in FIG. 5 designates an imaging relationship.

Light emitted from the discharge lamp 15 is converted into parallel light by the parabolic mirror 16, and is condensed to an incident surface of the integrator rod 19 by the condenser lenses 17A and 17B. Color filters 18 that transmit color light beams of red, blue and green are arranged on a periphery of the color wheel 18 arranged in a vicinity of the incident surface of the integrator rod 19. When the color wheel 18 rotates, the incident light to the integrator rod 19 is separated into color light beams according to time division. The integrator rod 19 is a glass rod of rectangular solid, and totally reflects and overlap incident light in the inner surface of the rod, so as to emit light flux having uniform intensity distribution from an emission surface. The integrator rod 19 may be a hollow rod having a reflection surface in its inner surface. The relay lenses 20A to 20C, the diaphragm 21, the mirror 22 and the entrance lens 23 form an image of the emission surface of the integrator rod 19 onto the mirror plane 12 of the DMD 3. As a result, the mirror plane 12 of the DMD 3 is illuminated with uniform light intensity.

Figure 7:
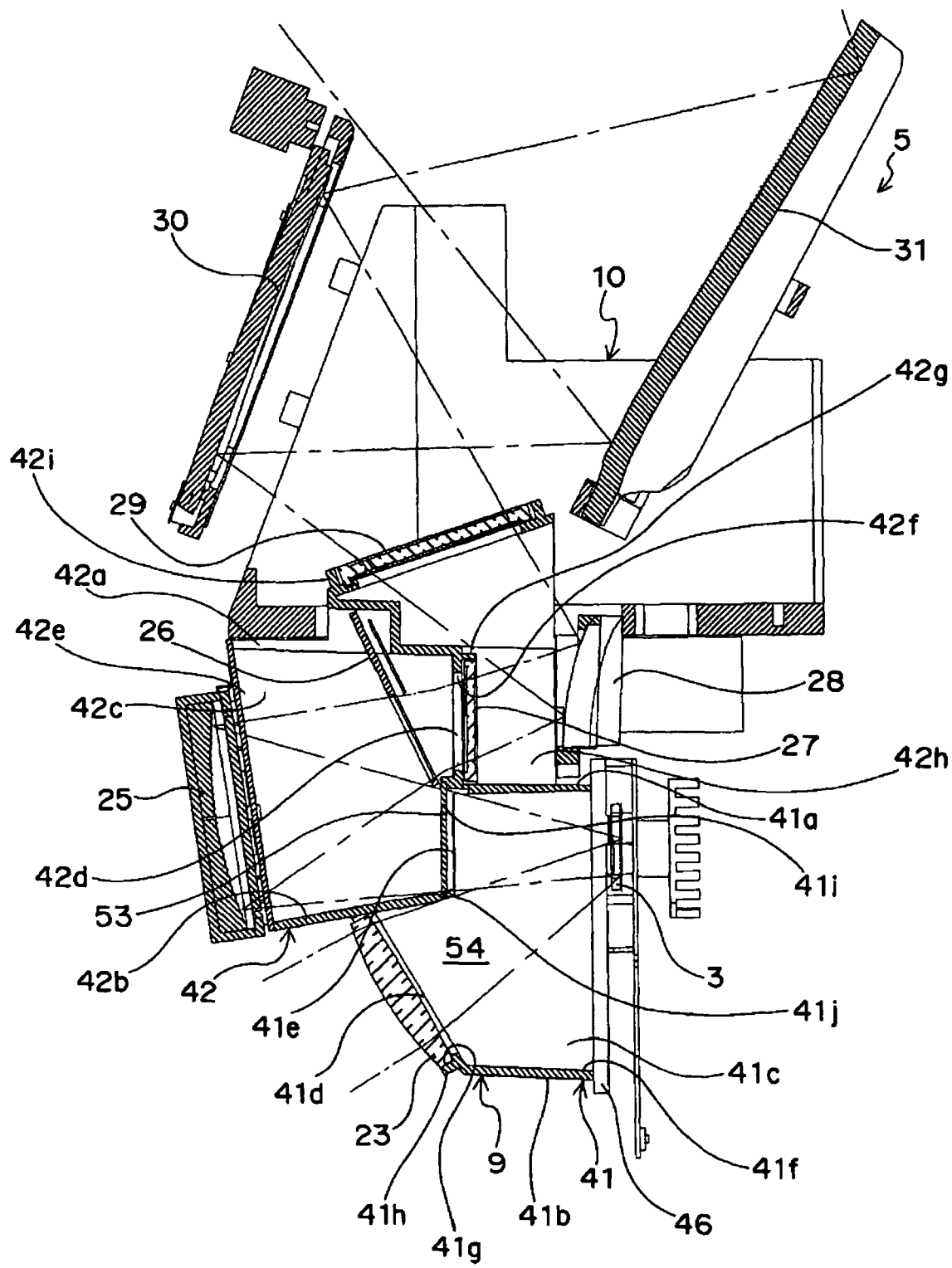
FIG. 7 is a sectional view taken along line VII-VII in FIG. 2.

The mirror 22 which is arranged between the relay lenses 20A to 20C and the entrance lens 23 bends an optical path of the illumination light diagonally upward right from a direction towards a front side in FIG. 1. For this reason, as shown in FIGS. 7 and 8 the most clearly, the illumination light from the illumination optical system 4 is emitted from a diagonally lower side to the DMD 3. With respect to the center of mirror plane (image forming surface) 12, a principal ray of illumination light entering DMD3, a principal ray of the projection light and a principal ray of OFF light are on the same plane.

(Projection Optical System)

With reference to FIGS. 1, 7 and 8, the projection optical system 5 has four curved mirrors 25, 28, 30 and 31, two aberration correcting plates 27 and 29, and one variable diaphragm mechanism 26. Concretely, the concave mirror 25, the variable diaphragm mechanism 26, the first aberration correcting plate 27, the convex mirror 28, the second aberration correcting plate 29, the first free curved mirror 30, and the second free curved mirror 31 are arranged in this order from the side of the DMD 3. The concave mirror 25 has spherical surface, and the convex mirror 28 has rotationally symmetrical aspherical surface. The concave mirror 25, the variable diaphragm mechanism 26, the first aberration correcting plate 27 and the convex mirror 28 in the optical parts of the projection optical system 5 are held by the lower optical component holding member 9, and the first and second free curved mirrors 30 and 31 are held by the upper optical component holding member 10. The aberration correcting plate is a refractive optical element which does not substantially have an optical power, and has a role in correcting aberration generated in the curved mirrors.

The concave mirror 25 is arranged so as to be opposed to the DMD 3. The convex mirror 28 is arranged slightly above the concave mirror 25 in an opposed manner. Similarly, the first free curved mirror 30 is arranged slightly above the convex mirror 28 in an opposed manner, and also the second free curved mirror 31 is arranged slightly above the first free curved mirror 30 in an opposed manner. The light flux from the DMD 3, therefore, is reflected by the concave mirror 25, the convex mirror 28, the first free curved mirror 30, and the second free curved mirror 31 so as to be bent and go upward, and is emitted to the first plane mirror 6A.

With reference to FIGS. 3, 4, 7 and 8, the lower optical component holding member 9 and the optical parts held by it are explained in detail below. The lower optical component holding member 9 has first and second tube portions 41 and 42 which extend in a horizontal direction entirely. The second tube portion 42 is formed so as to be connected to the first tube portion 41, and is in a position on an upper left side in FIG. 7 with respect to the first tube portion 41. The first tube portion 41 has a top wall 41a, a bottom wall 41b, a pair of side walls 41c opposed to each other, a lower end wall 41d which closes a lower portion of one end (left side in FIG. 7), and an upper end wall 41e which closes an upper portion of one end. An opening 41f is formed on the other end (right side in FIG. 7).

The second tube portion 42 has a top wall 42a, a bottom wall 42b, a pair of side walls 42c opposed to each other, and an end wall 42d which closes an upper portion of one end (right side in FIG. 7). An opening 42e is formed on the other end (left side in FIG. 7). Further, the seats 43a and 43b are provided to the outside of the second tube portion 42. The bottom wall 42b of the second tube portion 42 slightly projects to an inside of the first tube portion 41, and the lower end wall 41d of the first tube portion 41 is provided below the bottom wall 42b, and the upper end wall 41e of the first tube portion 41 is provided above the bottom wall 42b. On the other hand, the top wall 41a of the first tube portion 41 extends to the end wall 42d of the second tube portion 42.

The opening 41f of the first tube portion 41 positioned on the right in FIGS. 7 and 8 (front side in FIGS. 3 and 4) is closed in a sealed state by the image forming device holding plate 46 which holds the DMD 3. The DMD 3 is not shown in FIGS. 3 and 4.

A mounting constitution of the image forming device holding plate (image forming device holder) 46 with respect to the first tube portion 41 is explained below. Totally four screw stoppers 47a, 47c, 47d and 47f (each two of them are on the right and left sides), and two locating bosses 47b and 47e (each is on the right and left sides) are provided to a vicinity of the opening 41f of the first tube portion 41, and the respective screw stoppers 47a, 47c, 47d and 47f are formed with an internal thread portion 48. Further, a contact surface 49 is formed at forward ends of the four screw stoppers 47a, 47c, 47d and 47f corresponding to four corners of the opening 41f. Four through holes 46a are formed in positions corresponding to the internal thread portions 48 of the screw stoppers 47a, 47c, 47d and 47f in the image forming device holding plate 46. Through holes are formed in positions corresponding to the locating bosses 47b and 47e in the image forming device holding plate 46. When screws 51 which are inserted into the through holes 46a are screwed into the screw stoppers 47a, 47c, 47d and 47f, the image forming device holding plate 46 is fixed to the first tube portion 41. The vicinities of the four corners of the image forming device holding plate 46 come in contact with the four contact surfaces 49, respectively, and thus the image forming device holding plate 46 is held to the first tube portion 41 in predetermined position and posture.

Figure 9:
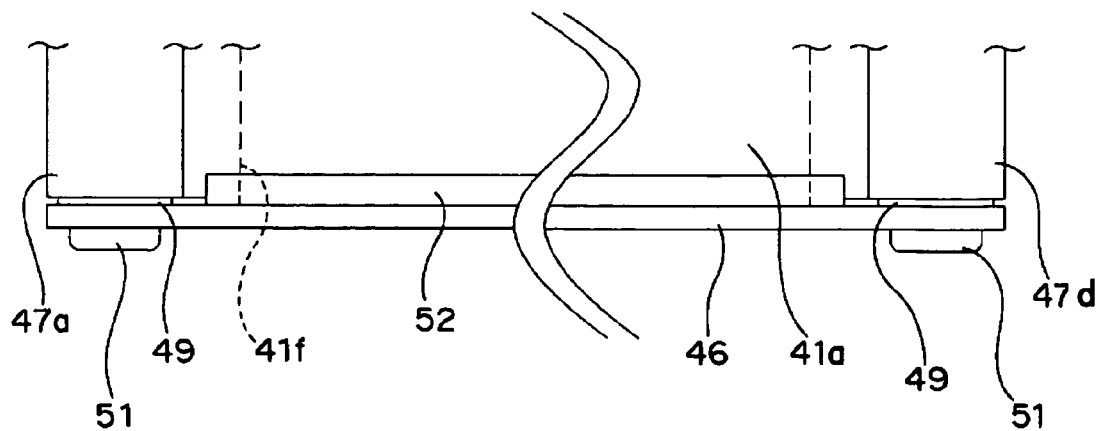
FIG. 9 is a partially plan view of a mounting structure of an image forming device holding plate.
Figure 10:
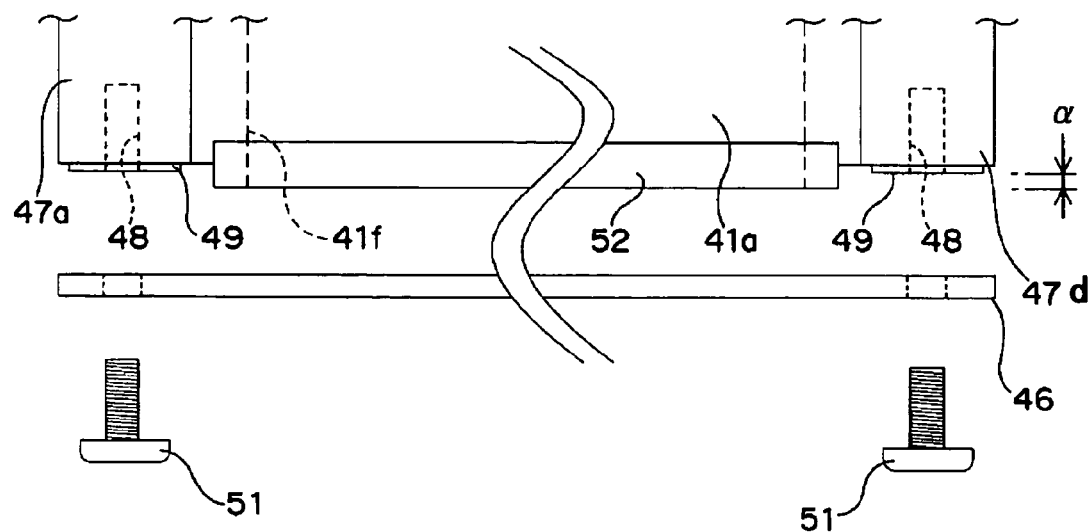
FIG. 10 is an exploded partially plan view of the mounting structure of the image forming device holding plate.

As shown in FIGS. 3 and 9, a rectangular frame shaped elastic member 52 is set between the image forming device holding plate 46 and the peripheral edge of the opening 41f in a compressed state. The elastic member 52 has a function for closing the opening 41f by means of the image forming device holding plate (image forming device holder) 46 in a sealed state. A thickness of the elastic member 52 is set so that the elastic member 52 protrudes further than the contact surface 49 as shown by a symbol α in FIG. 10 before the image forming device holding plate 46 is mounted, namely, in a non-compressed state. Shims with the same thickness are arranged on the four contact surfaces 49, respectively, for focus adjustment, so that the distance to the DMD 3 from the projection optical system 5 is occasionally adjusted. Even in the case where such adjustment is made, if the thickness of the elastic member 52 is set as mentioned above, the elastic member 52 comes in contact with the image forming device holding plate 46 securely, so that the opening 41f is closed in the sealed state. An opening 41g is formed also on the lower end wall 41d of the first tube portion 41 positioned on the left side (inner side in FIGS. 3 and 4) in FIGS. 7 and 8. The entrance lens 23 of the illumination optical system 4 is mounted to a lens holding portion 41h formed on the peripheral edge of this opening 41g. The opening 41g of the lower end wall 41d is closed in a sealed state by the entrance lens 23.

An opening 41i for connecting the inside of the first tube portion 41 and the inside of the second tube portion 42 is formed on the upper end wall 41e of the first tube portion 41 positioned on the left side (inner side in FIGS. 3 and 4) in FIGS. 7 and 8. The optical path from the DMD 3 to the concave mirror 25 as the first optical part of the projection optical system 5 passes through the opening 41i. A cover glass (transparent dust-proof cover) 53 composed of a flat plate glass is mounted to a cover holding portion 41j formed on the peripheral edge of the opening 41i. The opening 41i of the upper end wall 41e is closed by the cover glass 53. As detailed later, in order to prevent the projection light reflected by a cover glass 53 from being reflected by the micromirror 11B in the OFF state and from entering the projection optical system 5, it is necessary to set an angle $\theta_x$ of the cover glass 53 within a predetermined range. The cover glass 53 is different from a cover glass for protecting the micromirrors of the DMD 3.

The inside of the first tube portion 41 having the above constitution is a sealed space 54 which is surrounded by the image forming device holding plate 46, the elastic member 52, the entrance lens 23 of the illumination optical system 4 and the cover glass 53 as well as the top wall 41a, the bottom wall 41b, the side walls 41c, the lower end wall 41d and the upper end wall 41e of the first tube portion 41. In other words, the mirror plane 12 of the DMD 3, a final portion of the optical path from the illumination optical system 4 to the mirror plane 12, and a first portion of the optical path from the DMD 3 to the concave mirror 25 as the first optical part of the projection optical system 5 are in the inside of the sealed space 54. When the surrounding area of the mirror plane 12 of DMD 3 is made to be the sealed space 54, adhesion of dust and dirt into the DMD 3 which causes deterioration in the image quality can be prevented.

Both or at least one of surfaces of the cover glass 53 may have a curved surface having an aberration correcting function. Such a cover glass can be obtained by glass molding, injection molding of plastic, or composite molding of UV cured resin on a plane glass substrate. Since light flux is comparatively converged in a position of the cover glass 53, the glass molding and the composite forming of UV cured resin on a glass substrate are preferable from the viewpoint of heat. When the aberration correcting function is provided to the cover glass 53, the high optical performance and the prevention of adhesion of dust and dirt to the DMD 3 can be simultaneously realized.

A clean degree of the sealed space 54 is preferably set within a range of higher than class 5000 to lower than class 100. The clean degree is based on Fed-Std-209D (American Federal Standard 209D), and it is an upper limit value of a particle number in 1 CF (cubic feet) (about 28.3 litter) with respect to 0.5 μm. When the clean degree of the sealed space 54 is class 5000 or less, the image quality is remarkably deteriorated due to an image of dust and dirt projected onto the enlarged and projected image. On the other hand, a very expensive facility is required for setting the clean degree of the sealed space 54 to class 100 or more, but even if the clean degree is less than class 100, the deterioration in image quality which becomes a practical problem caused by dust and dirt does not occur as long as the clean degree is more than class 5000.

The concave mirror 25 is mounted to the opening 42e of the second tube portion 42. The variable diaphragm mechanism 26 is disposed in the second tube portion 42. The opening 42f is formed also on the end wall 42d of the second tube portion 42, and the first aberration correcting plate 27 is mounted to a holding portion 42g formed on the peripheral edge of the opening 42f. Further, the convex mirror 28 is mounted to a mirror holding portion 42h formed on an outer side with respect to the holding portion 42g. The second aberration correcting plate 29 is mounted to a holding portion 42i formed on an upper outside of the second tube portion 42. The first and second free curved mirrors 30 and 31 are mounted to the upper optical component holding member 10.

The four curved mirrors 25, 28, 30 and 31, and the two aberration correcting plates 27 and 29 composing the projection optical system 5 are arranged on the outside of the sealed space 54. The curved mirrors 25, 28, 30 and 31 can be, therefore, easily accessed at the time of manufacturing or the like, so that the positions and angles can be adjusted. The adjustment of the mirrors in the projection optical system 5 is detailed later.

(The Angle of the Cover Glass)

Figure 11:
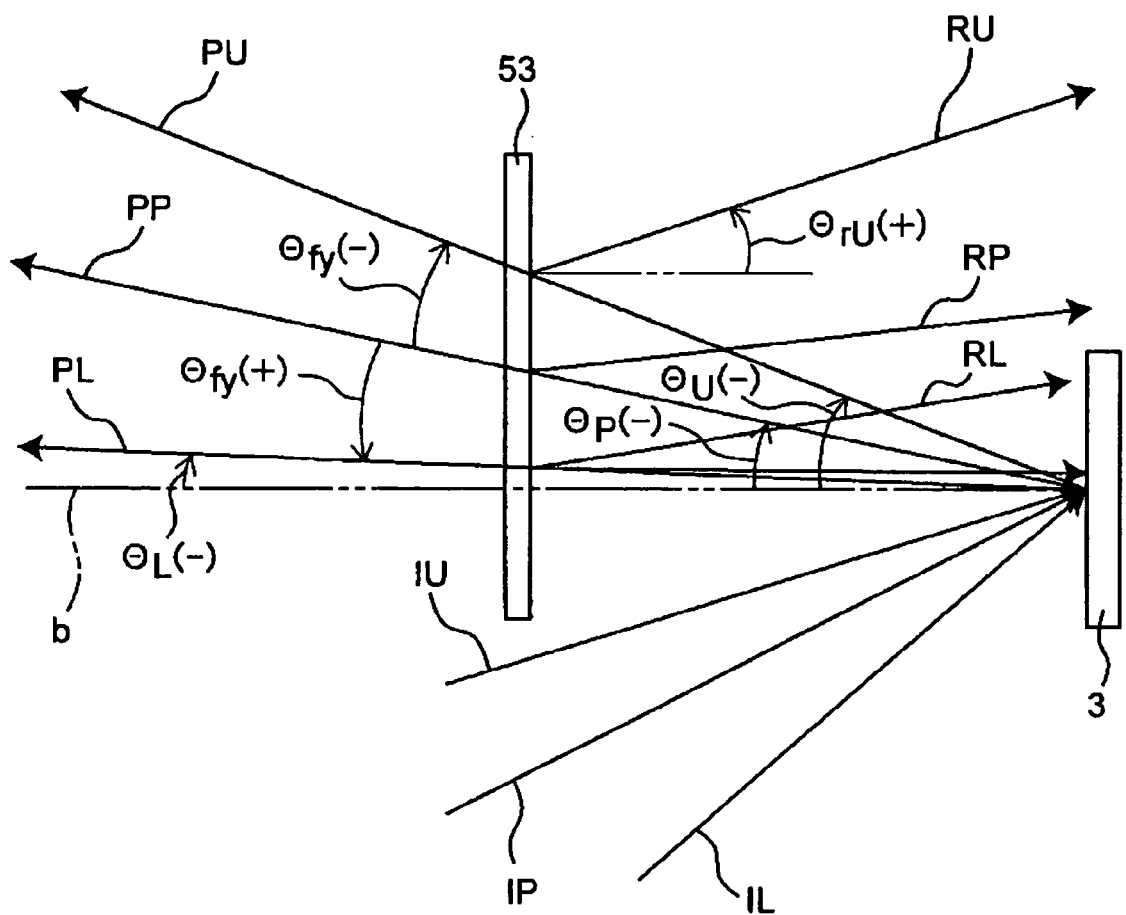
FIG. 11 is a schematic diagram illustrating an optical path around DMD.
Figure 13:
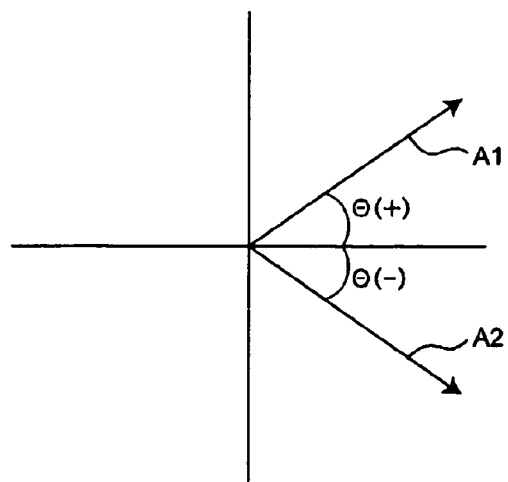
FIG. 13 is a diagram for explaining definition of symbols of angles of rays and the optical element.

With reference to FIGS. 11 and 12, the setting of the angle $\theta_x$ of the cover glass 53 with respect to a reference line as a normal line of the mirror plane 12 in the DMD 3 is explained below. In this specification, as shown in FIG. 13, symbols of rays and angles of reflection surfaces with respect to the reference line b are defined. As shown by an arrow A1, when an advancing direction of the ray or an extending direction of the normal line from the reflection surface is a counterclockwise direction with respect to the reference, a symbol of an angle θ is positive. On the contrary, as shown by an arrow A2, the advancing direction of the ray or the extending direction of the normal line from the reflection surface is a clockwise direction with reference to the reference, the angle θ is negative.

Definition of various angles of light is explained. An angle of a principal ray PP of the projection light with respect to the reference line b is designated by $\theta_P$. A divergence angle of the projection light to up and down with respect to FNo (F-number) of the projection light in a plane of the paper is designated by $\theta_{fy}$. Further, angles of a ray on the top of the divergence of the projection light (upper ray) PU and a ray on the bottom (lower ray) PL with respect to the reference line b are designated by $\theta_U$ and $\theta_L$, respectively. Angles of reflected light RP, RU and RL obtained when a principal ray PP of the projection light, the upper ray PU and the lower ray PL are reflected from the cover glass 53 with respect to the reference line b are designated by $\theta_{rP}$, $\theta_{rU}$ and $\theta_{rL}$, respectively. Angles of reflected light GP, GU and GL obtained when the reflected light RP, RU and RL of the projection light are reflected from the micromirror 11B with respect to the reference line b are designated by $\theta_{GP}$, $\theta_{GU}$ and $\theta_{GL}$, respectively. Angles of the micromirror 11A in the ON state and the micromirror 11B in the OFF state with respect to the reference line b are designated by $\theta_{dON}$ and $\theta_{dOFF}$, respectively. In FIG. 11, symbols IP, IU and IL designate the principal ray, the upper ray and the lower ray of the incident light (illumination light) for the DMD 3.

The divergence angle $\theta_{fy}$ of the projection light and FNo establish a relationship which is expressed by the following equation (1).

$$\theta_{fy} = \sin^{-1}[1/(2F\text{No})] \tag{1}$$

According to a geometric relationship, the angles $\theta_U$ and $\theta_L$ of the upper ray PU and the lower ray PL are expressed by the angle $\theta_P$ of the principal ray PP and the divergence angle $\theta_{fy}$ of the projection light according to the following equations (2) and (3).

$$\theta_U = \theta_P - \theta_{fy} \tag{2}$$

$$\theta_L = \theta_P + \theta_{fy} \tag{3}$$

According to the geometric relationship and the equations (2) and (3), angles $\theta_{rU}$ and $\theta_{rL}$ of the reflected light RU and RL of the upper ray PU and the lower ray PL from the cover glass 53 are expressed by the angle $\theta_x$ of the cover glass 53, the angle $\theta_P$ of the principal ray and the divergence angle $\theta_{fy}$ of the projection light according to the following equations (4) and (5).

$$\theta_{rU} = 2\theta_x - \theta_U \tag{4}$$
$$= 2\theta_x - \theta_P + \theta_{fy}$$

$$\theta_{rL} = 2\theta_x - \theta_L \tag{5}$$
$$= 2\theta_x - \theta_P - \theta_{fy}$$

According to the geometric relationship and the equations (4) and (5), angles $\theta_{GU}$ and $\theta_{GL}$ of the reflected light GU and GL obtained when the reflected light RU and RL of the projection light are reflected from the micromirror 11B in the OFF state are expressed by the angles $\theta_{dON}$ and $\theta_{dOFF}$ of the micromirrors 11A and 11B in the ON state and the OFF state, the angle $\theta_x$ of the cover glass 53, the angle $\theta_P$ of the principal ray PP and the divergence angle $\theta_{fy}$ of the projection light according to the following equations (6) and (7).

$$\theta_{GU} = 2\theta_{dOFF} - \theta_{rU} \qquad (6)$$
$$= 2\theta_{doff} - 2\theta_x + \theta_p - \theta_{fy}$$

$$\theta_{GL} = 2\theta_{dOFF} - \theta_{rL} \qquad (7)$$
$$= 2\theta_{dOFF} - 2\theta_x + \theta_p + \theta_{fy}$$

When the projection light reflected from the cover glass 53 is reflected by the micromirror 12 in the OFF state and enters the projection optical system 5, the light becomes unnecessary light to be imaged on the screen 7, thereby causing deterioration in image quality such as deterioration in contrast. Since illumination light is emitted to the DMD 3 from below, a ray, which is obtained when the reflected light RL of the lower ray PL from the cover glass 53 is reflected by the micromirror 11B in the OFF state, namely, reflected light GL enters the projection optical system 5 the most easily. A condition for preventing the reflected light GL from entering the projection optical system 5 is such that the angle $\theta_{GL}$ of the reflected light GL should be smaller than the angle $\theta_U$ of the upper ray PU. In order to prevent the reflected light GL from entering the projection optical system 5, the following equation (8) should hold.

$$\theta_{GL} < \theta_U \qquad (8)$$

When the equation (7) is assigned to a left-hand side of the equation (8) and the equation (2) is assigned to a right-hand side, the following equation (9) is obtained. The equation (9) defines a lower limit of the angle $\theta_x$ of the cover glass 53.

$$\theta_x > \theta_{dOFF} + \theta_{fy} \qquad (9)$$

When the value of the angle $\theta_x$ (code is positive) of the cover glass 53 is large, namely, when the upper end of the cover glass 53 greatly closer to the DMD 3 than the lower end in FIGS. 11 and 12, the projection light from the DMD 3 enters the cover glass 53 obliquely, and thus loss of the projection light due to surface reflection using the cover glass 53 is great. In order to sufficiently reduce the loss using the surface reflection, it is preferable that the incident angle of the projection light with respect to the cover glass 53 is less than 60°.

Since the illumination light is emitted to the DMD 3 from below and the code of the angle $\theta_P$ of the principal ray PP is negative, the projection light which has the largest incident angle with respect to the cover glass 53 is the upper ray PU. The condition that the incident angle of the projection light with respect to the cover glass 53 is less than 60° is, therefore, expressed by the following equation (10).

$$\theta_x - \theta_U < 60° \qquad (10)$$

When the equation (2) is assigned to the second term of the left-hand side in the equation (10), the following equation (11) is obtained. The equation (11) defines an upper limit of the angle $\theta_x$ of the cover glass 53.

$$\theta_x < \theta_P - \theta_{fy} + 60° \qquad (11)$$

According to the equations (9) and (11), it is preferable that the angle $\theta_x$ of the cover glass 53 is set within a range defined by the following equation (12). When the angle $\theta_x$ is set to this range, light reflected from the cover glass 53 can be prevented from being reflected by the micromirror 11B in the OFF state and entering the projection optical system 5. The loss due to surface reflection by means of the cover glass 53 can be sufficiently reduced.

$$\theta_{dOFF} + \theta_{fy} < \theta_x < \theta_P - \theta_{fy} + 60° \qquad (12)$$

FIG. 17 shows values of the left-hand side and the right-hand side of the equation (12) according to combinations of concrete numerical values of the angle $\theta_{dOFF}$ of the micromirror 11B in the OFF state, the divergence angle $\theta_{fy}$ of the projection light and the angle $\theta_P$ of the upper ray PP. The angle $\theta_{dOFF}$ of the micromirror 11B in the OFF state is generally about −10° to −14°, and when the angle $\theta_{dOFF}$ is determined, the values of the other two angles $\theta_{fy}$ and $\theta_P$ are limited to a certain range. The seven combinations of the angles $\theta_{dOFF}$, $\theta_{fy}$, and $\theta_P$ shown in FIG. 17 are examples of the combinations of the values to be determined in such a manner. As is clear from FIG. 17, in any combinations of $\theta_{dOFF}$, $\theta_{fy}$, and $\theta_P$, the value of the left-hand side in the equation (12) obtains a negative value (−1 to −6°) which is close to zero. The angle $\theta_x$ of the cover glass 53 which satisfies the condition of the equation (12) is, therefore, basically positive ($\theta_x > 0$), the cover glass 53 is in a posture such that its lower end is closer to the DMD 3 than the upper end. Particularly in the case of $\theta_{dOFF} = -\theta_{fy}$, $\theta_x > 0$ as is clear from the equation (12).

On the other hand, even if the angle $\theta_x$ of the cover glass 53 is negative ($\theta_x < 0$), when a distance X from the mirror plane 12 of the DMD 3 to the upper end of the cover glass 53 (see FIG. 11) is sufficiently large, namely, the DMD 3 is arranged so as to be sufficiently separated from the cover glass 53, the condition for preventing the ray reflected by the micromirror 11B in the OFF state from entering the projection optical system 5 is present. This condition is explained below.

When the distance X is sufficiently large, a ray (reflected light GU), which is obtained when the reflected light RU obtained when the upper ray PU emitted from the upper end of the DMD 3 is reflected by the cover glass 53 is reflected by the micromirror 11B in the OFF state, enters the projection optical system 5 the most easily. The condition for preventing the reflected light GU from entering the projection optical system 5 is such that the angle $\theta_{GU}$ of the reflected light GU should be larger than the angle $\theta_L$ of the lower ray PL of the projection light. In order to prevent the reflected light GU from entering the projection optical system 5, the following equation (13) should hold.

$$\theta_{GU} > \theta_L \qquad (13)$$

When the equation (6) is assigned to the left-hand side of the equation (13) and the equation (3) is assigned to the right-hand side, the following equation (14) holds. The equation (14) defines the condition for preventing the ray reflected from the micromirror 11B in the OFF state from entering the projection optical system 5 when $\theta_x$ is negative.

$$\theta_x < \theta_{dOFF} - \theta_{fy} \qquad (14)$$

The angle $\theta_{dOFF}$ of the micromirror 11B in the OFF state is about −10° to −14°, and when the angle $\theta_{dOFF}$ is determined, the value of the angle $\theta_{fy}$ is limited to a certain range. FIG. 18 shows combinations of the angle $\theta_{dOFF}$ and $\theta_{fy}$ determined in such a manner, and values of the left-hand side in the equation (14) according to the combinations. When the angles $\theta_{dOFF}$ and $\theta_{fy}$ obtain the values shown in FIG. 18, the angle $\theta_x$ of the cover glass 53 is less than about −15° to −20°.

Even when the equation (14) does not hold, it is only necessary that the reflected light RU, which is obtained when the upper ray PU emitted from the upper end of the DMD 3 is reflected from the cover glass 53, is not emitted to the mirror plane 12 of the DMD 3. In other words, it is only necessary that a position (distance Y from the upper end of the mirror plane 12 of the DMD 3) of a virtual plane including the mirror plane 12 of the DMD 3, to which the reflected light RU of the upper ray PU emitted from the upper end of the DMD 3 reflected from the cover glass 53 is emitted, is higher than a height H of the mirror plane 12 of the DMD 3. This condition is expressed by the following equation (15).

$$Y>H \quad (15)$$

According to a geometric relationship, the distance Y is expressed by the following equation (16).

$$Y=X(\tan\theta_U - \tan\theta_{rU}) \quad (16)$$

When the equations (2) and (6) are assigned to the equation (16), the following equation (17) is obtained.

$$Y=X\{\tan(\theta_P - \theta_{fv}) - \tan(2\theta_x - \theta_P + \theta_{fv})\} \quad (17)$$

When the equation (17) is assigned to the equation (15), the following equation (18) is obtained. Also when the angle $\theta_x$ of the cover glass 53 and the distance X from the mirror plane 12 of the DMD 3 to the cover glass 53 are set in order that the equation (18) holds, the projection light reflected from the cover glass 53 can be prevented from being reflected by the micromirror 11B in the OFF state and entering the projection optical system 5.

$$\tan(\theta_P - \theta_{fv}) - \tan(2\theta_x - \theta_P + \theta_{fv}) > H/X \quad (18)$$

On the other hand, when the equation (16) is assigned to the equation (15), the following equation (19) is obtained.

$$\theta_{rU} < \tan^{-1}\{-H/X + \tan(\theta_P - \theta_{fv})\} \quad (19)$$

When the equation (4) is assigned to the equation (19), the following equation (20) is obtained.

$$\theta_x < \tan^{-1}\{-H/X + \tan(\theta_P - \theta_{fv})\}/2 + (\theta_P - \theta_{fv})/2 \quad (20)$$

Also when the angle $\theta_x$ of the cover glass 53 is set in order that the equation (20) holds, the projection light reflected from the cover glass 53 can be prevented from being reflected by the micromirror 11B in the OFF state and entering the projection optical system 5.

FIG. 19 shows values of the right-hand side of the equation (20) according to combinations of the concrete numerical values of the height H of the mirror plane 12 in the DMD 3, the distance X from the mirror plane 12 of the DMD 3 to the upper end of the cover glass 53, the divergence angle $\theta_{fv}$ of the projection light and the angle $\theta_P$ of the principal ray PP of the projection light.

(Mirror Adjustment)

Mirror adjustment of the projection optical system 5 in a state before the image forming device holding plate 46 is mounted to the first tube portion 41 at the time of manufacturing or the like is explained below.

Figure 14:
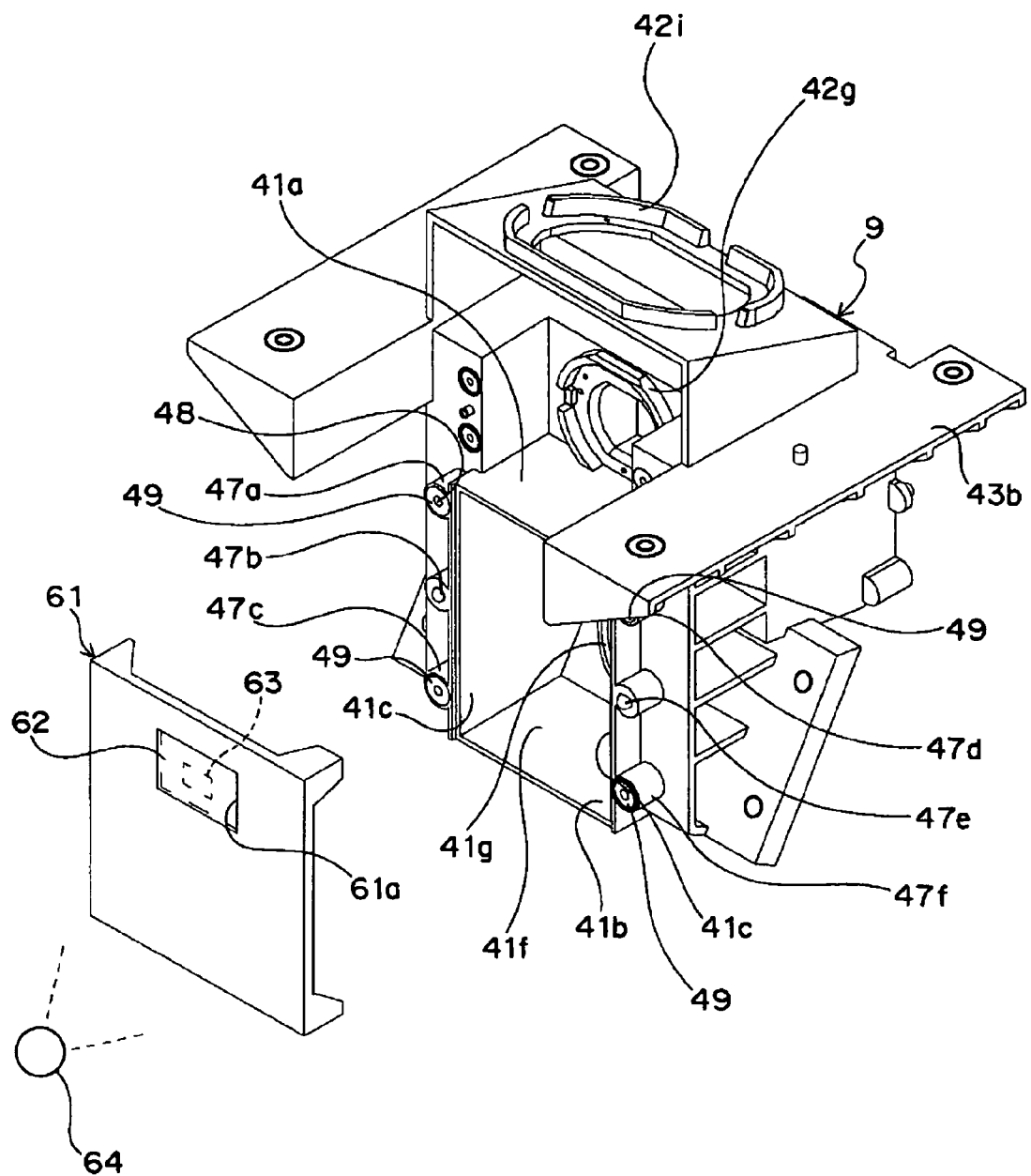
FIG. 14 is an exploded perspective view illustrating a chart holding member and the lower optical component holding member.
Figure 15:
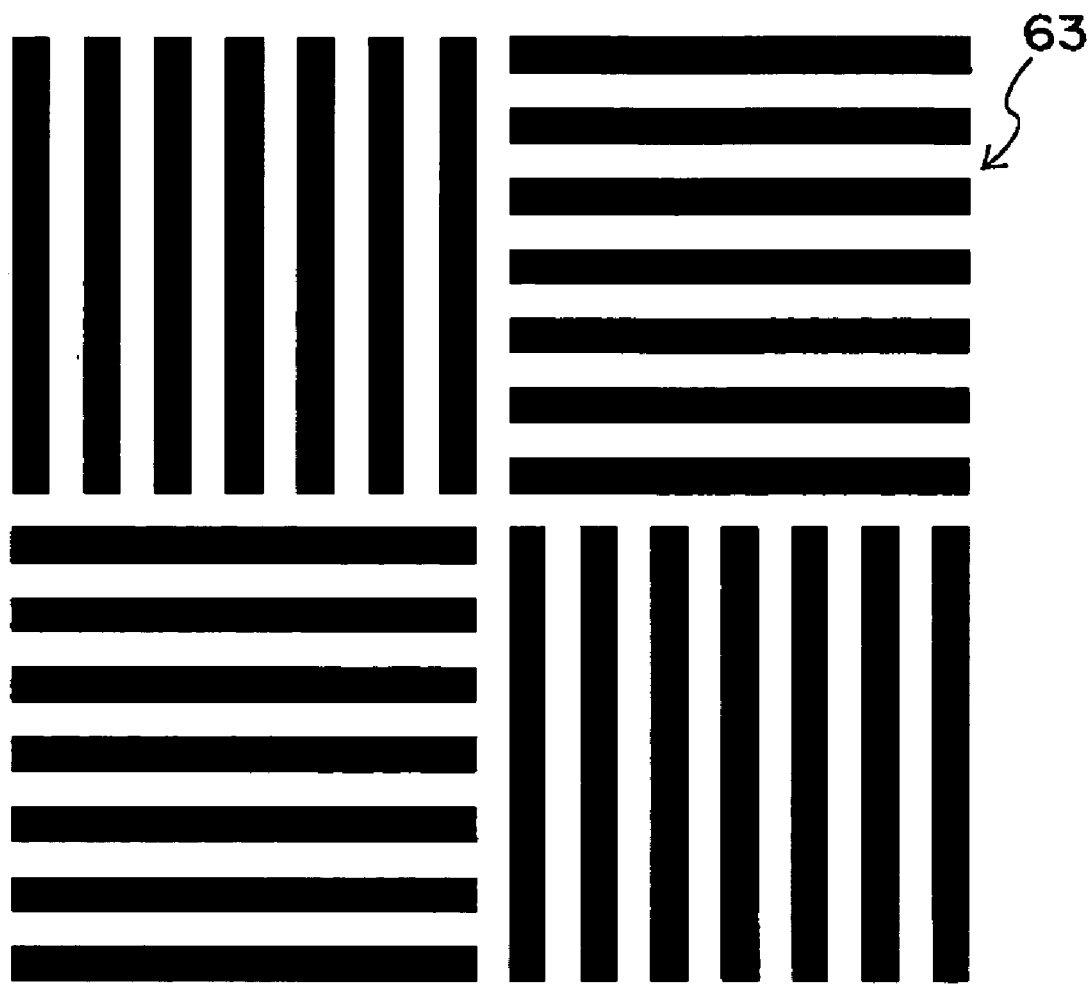
FIG. 15 is a front view illustrating one example of the chart.

A chart holding member 61 to be used for adjusting the mirrors shown in FIG. 14 can be mounted to the opening 41f of the first tube portion 41 of the lower optical component holding member 9 detachably instead of the image forming device holding plate 46. A through hold 61a is formed on the chart holding member 61, and a transparent plate 62 is mounted so as to close the through hole 61a. The through hole 61a is formed in a position corresponding to the DMD 3 held by the image forming device holding plate 46. Specifically, when the chart holding member 61 is mounted to the first tube portion 41, the through hole 61a is positioned in a portion where the DMD 3 is arranged when the image forming device holding plate 46 is mounted to the first tube portion 41. The transparent plate 62 is formed with a chart 63 as a diagram or a pattern for adjustment as shown in FIG. 15 for example.

At the time of the mirror adjustment, the chart holding member 61 is mounted to the first tube portion 41 so as to close the opening 41f. At this time, the transparent plate 62 is positioned in a portion where the DMD 3 is arranged when the rear-projection television 1 is completed. Light is emitted from a light source 64 for adjusting the mirrors to the transparent plate 62. The light which transmits through the transparent plate 62 forms an image corresponding to the chart 63, and the image is projected to the screen 7 via the projection optical system 5 and the plane mirrors 6A and 6B. While the image of the chart 63 projected onto the screen 7 is being referred to, the position and the angle of the curved mirrors provided to the projection optical system 5 are adjusted. As a result, even before the DMD 3 and the illumination optical system 4 are mounted to the rear-projection television 1, aberration can be adjusted and distortion can be corrected.

The four curved mirrors, namely, the concave mirror 25, the convex mirror 28, the first free curved mirror 30 and the second free curved mirror 31 are provided to the projection optical system 5, but the concave mirror 25 and the first free curved mirror 30 and the second free curved mirror 31 are the subject of adjustment.

When a thicknesswise direction of the rear-projection television 1 is an X axis, a height-wise direction is a Y axis, and a lateral direction is a Z axis (see FIG. 1), adjustment items for each curved mirror are as follows. The adjustment of the concave mirror 25 is mainly a parallel movement in the X-axial direction for focus adjustment, rotation about the Y axis for adjustment of coma aberration, and rotation about the Z axis for adjustment of astigmatism. The adjustment of the first free curved mirror 30 is a parallel movement to the Y-axial direction for adjustment of astigmatism and distortion aberration, rotation about the Y axis, rotation about the Z axis, and a parallel movement to the X-axial direction for adjustment of magnification as an arbitrary adjustment item. The adjustment of the second free curved mirror 31 is rotation about the Y axis and rotation about the Z axis for correction of keystone (trapezoidal distortion), and rotation about the X axis for correcting parallelogram distortion as an arbitrary adjustment item.

Figure 16:
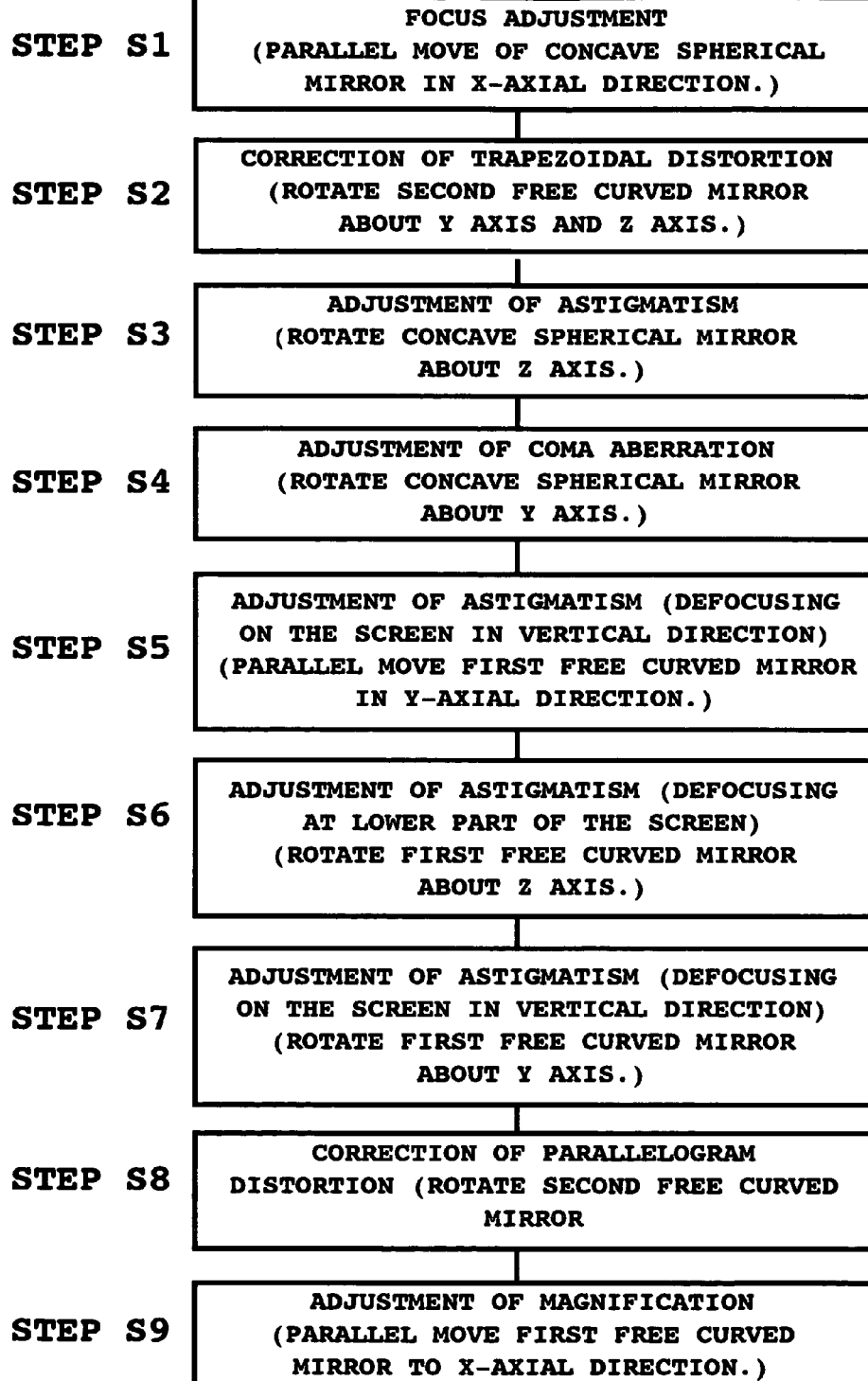
FIG. 16 is a flowchart for explaining a procedure for mirror adjustment according to the embodiment of the present invention.

The adjustment procedure is explained with reference to FIG. 16. The concave mirror 25 is parallel moved in the X-axial direction, so that the focus is adjusted (step S1). The second free curved mirror 31 is rotated about the Y axis and the Z axis so that the parallelogram distortion is corrected (step S2). The concave mirror 25 is rotated about the Z axis so that astigmatism is adjusted (step S3). The concave mirror 25 is rotated about the Y axis so that coma aberration is adjusted (step S4). The focus adjustment, the correction of the trapezoidal distortion, the adjustment of astigmatism and the adjustment of coma aberration (steps S1 to S4) are the essentials.

The image of the chart 63 projected onto the screen 7 is referred to, and if necessary, the adjustments at steps S5 to S7 are made. The first free curved mirror 30 is parallel moved in the Y-axial direction, so that the astigmatism (one-side blurring on the upper and lower parts of the screen) is adjusted (step S5). The first free curved mirror 30 is rotated about the Z axis so that the astigmatism (lower part of the screen) is adjusted (step S6). The first free curved mirror 30 is rotated about the Y axis, so that astigmatism (one-side blurring on right and left parts of the screen) is adjusted.

The adjustments at steps S1 to S7 are repeated until the aberration and distortion are reduced to a desired level. It is preferable that the following adjustments at steps S8 and S9 are further made. At step S8, the second free curved mirror 31 is rotated about the X axis, so that parallelogram distortion is corrected. At step S9, the first free curved mirror 30 is parallel moved in the X axial direction so that magnification is adjusted.

Also when the chart holding member 61 is mounted to the first tube portion 41, the inside of the first tube portion 41 becomes a sealed space. Since, however, the concave mirror 25, the first free curved mirror 30 and the second free curved mirror 31 which are the subject of adjustment, however, are arranged on the outside of the sealed space, it is easy to access these curved mirrors and parallel move and rotate them. The above adjustment method can be applied to the projection optical system which includes at least four curved mirrors, and the concave mirrors and convex mirrors in this order from the side of the image forming device. The mirror planes may be any one of spherical plane, aspherical plane and free curved plane.

The disclosure in this specification includes the invention whose object is to enable the adjustment of the projection optical system in the projection type image display apparatus in a state that the image forming device and the illumination optical system are not mounted as well as the inventions in claims. The present invention is a method of adjusting the projection optical system of the projection type image display apparatus which has a plurality of curved mirrors, and enlarges and projects an image formed by the image forming device. The projection optical system of the projection type image display apparatus is characterized in that transparency is provided, an adjustment member formed with an adjustment chart is arranged in a position where the image forming device is mounted, light is emitted to the adjustment member, an image of the adjustment chart as transmission light of the adjustment member is enlarged and projected by the projection optical system, at least one of the curved mirrors of the projection optical system is parallel moved and/or rotated based on the image of the adjustment chart enlarged and projected by the projection optical system.

According to the invention, even in a state that the image forming device and an illumination optical system that emits illumination light to the image forming device are not mounted to the image forming device, positions and postures of the curved mirrors in the projection optical system can be adjusted for focus adjustment, adjustment of coma aberration, adjustment of astigmatism, adjustment of distortion aberration, correction of trapezoidal distortion and the like.

Concretely, the projection type image display apparatus has an optical component holding member holding the projection optical system and an image forming device holder to which the image forming device is mounted. The adjustment member is held by an adjustment member holding body detachably mounted to the optical component holding member instead of the image forming device holder, and the adjustment holding body is mounted to the optical component holding member so that the adjustment member is arranged in a position where the image forming device is mounted.

More concretely, the projection optical system has the concave mirror, the convex mirror, the first free curved mirror and the second free curved mirror in this order from the side of the image forming device. The projection optical system parallel moves and/or rotates at least the concave mirror and the second free curved mirror based on the image of the adjustment chart enlarged and projected by the projection optical system.

The present invention is not limited to the embodiment, various modifications can be made. For example, the image forming device is not limited to the reflection type image forming device such as DMD, and may be a transmission type image forming device such as liquid crystal element. Further, the present invention exemplifies the rear-projection television as the rear-projection type image display apparatus, but the present invention can be applied also to a surface-projection type image display apparatus that projects an image from a front of the screen.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A projection image display apparatus comprising:
   an image forming device for forming an image;
   a projection optical system for projecting the image onto a screen, having a plurality of curved mirrors;
   an optical component holding member holding the image forming device;
   a transparent dust-proof cover arranged on an optical path between the image forming device and the curved mirror closest to the image forming device, the transparent dust-proof cover being held to the optical component holding member; and
   a sealed structure sealing at least a space between the image forming device and the transparent dust-proof cover.

2. The projection image display apparatus according to claim 1, wherein a part of the optical component holding member composes the sealed structure.

3. The projection image display apparatus according to claim 1, wherein the image forming device is a reflective image forming device.

4. The projection image display apparatus according to claim 3, further comprising an illumination optical system that emits illumination light to an image forming surface of the image forming device, wherein an optical member of the illumination optical system which is held to the optical component holding member composes a part of the sealed structure.

5. The projection image display apparatus according to claim 4, wherein the optical component holding member, the reflective image forming device, the optical member of the illumination optical system, and the transparent dust-proof cover compose the sealed structure.

6. The projection image display apparatus according to claim 3, wherein the transparent dust-proof cover is arranged so that a projection light reflected by the transparent dust-proof cover does not enter the projection optical system after being again reflected by the image forming device.

7. The projection image display apparatus according to claim 3, wherein
   the reflective image forming device has an image forming surface on which a plurality of micromirrors are arranged two-dimensionally,
   the image forming surface has a rectangular shape with a long side and a short side, each of the micromirrors has pivot parallel with the long side of the image forming surface, is set into any one of an ON state and an OFF state where rotational angles about the pivot are different from each other according to an input image signal, reflects the illumination light as projection light in a direction which is led to the screen via the projection optical system in the ON state, and reflects the illumination light in a direction which is not led to the screen in the OFF state,
   an angle of the transparent dust-proof cover with respect to a reference line as a normal line of the image forming surface is within a range defined by the following equation:

$$\theta_{dOFF} + \theta_{fy} < \theta_x < \theta_P - \theta_{fy} + 60°$$

where $\theta_x$ is the angle of the transparent dust-proof cover with respect to the reference line, $\theta_{dOFF}$ is an angle of the micromirror in the OFF state with respect to the reference line, $\theta_{fy'}$ is a divergence angle of projection light, and $\theta_P$ is an angle of a principal ray of the projection light with respect to the reference line.

8. The projection image display apparatus according to claim 3, wherein the reflective image forming device has an image forming surface where a plurality of micromirrors are arranged two-dimensionally, the image forming surface has a rectangular shape with a long side and a short side, each of the micromirrors has pivot parallel with the long side of the image forming surface, is set into any one of an ON state and an OFF state where rotational angles about the pivot are different from each other according to an input image signal, reflects the illumination light as projection light in a direction which is led to the screen via the projection optical system in the ON state, and reflects the illumination light in a direction which is not led to the screen in the OFF state, an angle of the transparent dust-proof cover with respect to a reference line as a normal line of the image forming surface is within a range defined by the following equation:

$$\theta_x < \theta_{dOFF} - \theta_{fy'}$$

where $\theta_x$ is the angle of the transparent dust-proof cover with respect to the reference line, $\theta_{dOFF}$ is an angle of the micromirror in the OFF state with respect to the reference line, and $\theta_{fy'}$ is a divergence angle of projection light.

9. The projection image display apparatus according to claim 3, wherein the reflective image forming device has an image forming surface where a plurality of micromirrors are arranged two-dimensionally, the image forming surface has a rectangular shape with a long side and a short side, each of the micromirrors has pivot parallel with the long side of the image forming surface, is set into any one of an ON state and an OFF state where rotational angles about the pivot are different from each other according to an input image signal, reflects the illumination light as projection light in a direction which is led to the screen via the projection optical system in the ON state, and reflects the illumination light in a direction which is not led to the screen in the OFF state, an angle of the transparent dust-proof cover with respect to a reference line as a normal line of the image forming surface is within a range defined by the following equation:

$$\tan(\theta_P - \theta_{fy'}) - \tan(2\theta_x - \theta_P + \theta_{fy'}) > H/X$$

where $\theta_x$ is the angle of the transparent dust-proof cover with respect to the reference line, $\theta_{fy'}$ is a divergence angle of projection light, $\theta_P$ is an angle of a principal ray of the projection light with respect to the reference line, X is a distance from the image forming device to the transparent dust-proof cover, and H is a height of the image forming surface.

10. The projection image display apparatus according to claim 1, wherein the transparent dust-proof cover has a curved shape with an aberration correcting function.

11. The projection image display apparatus according to claim 1, wherein a clean degree of a space sealed by the sealed structure based on American Federal Standard 209D is higher than class 5000 and lower than class 100.

12. The projection image display apparatus according to claim 1, wherein the image forming device is held to an opening formed on the optical component holding member via an image forming device holder, and the projection type image display apparatus has an elastic member set between the image forming device holder and a peripheral edge of the opening.

13. A projection image display apparatus comprising:

an image forming device forming an image;

a projection optical system for projecting the image onto a screen, having a plurality of curved mirrors;

an optical component holding member holding the image forming device and the curved mirrors; and a transparent dust-proof cover arranged on an optical path between the image forming device and the curved mirror closest to the image forming device, the transparent dust-proof cover being held to the optical component holding member, wherein the optical component holding member seals a space between the transparent dust-proof cover and the image forming device.

14. The projection image display apparatus according to claim 1, wherein the optical component holding member has a tube portion, the tube portion holding the transparent dust-proof cover at one end thereof and holding the image forming device at an other end thereof, the tube portion comprising the sealed structure.

15. The projection image display apparatus according to claim 14, wherein the image forming device is held to the optical component holding member via an image forming device holder.

16. The projection image display apparatus according to claim 15, wherein the image forming device is a reflection type image forming device, the optical component holding member has an opening for leading illumination light to the reflection type image forming device, and the opening is covered by a transparent member.

17. The projection image display apparatus according to claim 16, wherein the transparent member is a lens of an illumination optical system for leading light from a light source to the image forming device.

18. The projection image display apparatus according to claim 13, wherein the transparent dust-proof cover is arranged so that a projection light reflected by the transparent dust-proof cover does not enter the projection optical system after being again reflected by the image forming device.

19. An unit for a projection image display apparatus comprising:

an optical component holding member holding a concave mirror and having a portion to which an image forming device holder for holding a image forming device is fixed; and a transparent dust-proof cover arranged on an optical path between the image forming device and the concave mirror, the transparent dust-proof cover being held to the optical component holding member, wherein the optical component holding member seals a space between the image forming device and the dust-proof cover.

* * * * *